March 2, 1926.
J. A. MITCHELL
GRAIN DRILL TOOTH
Filed April 18, 1923
1,574,917
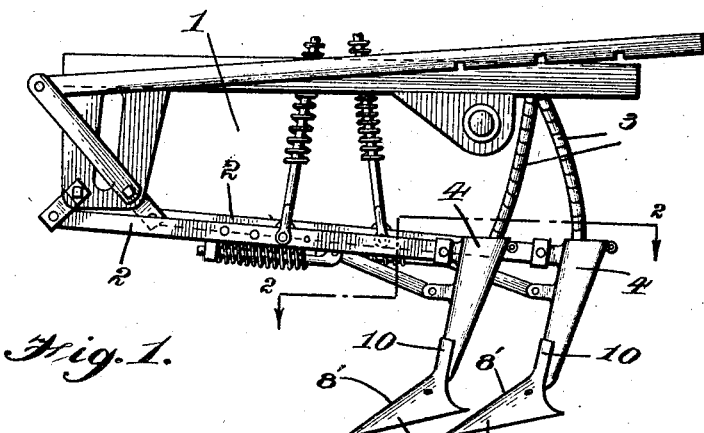
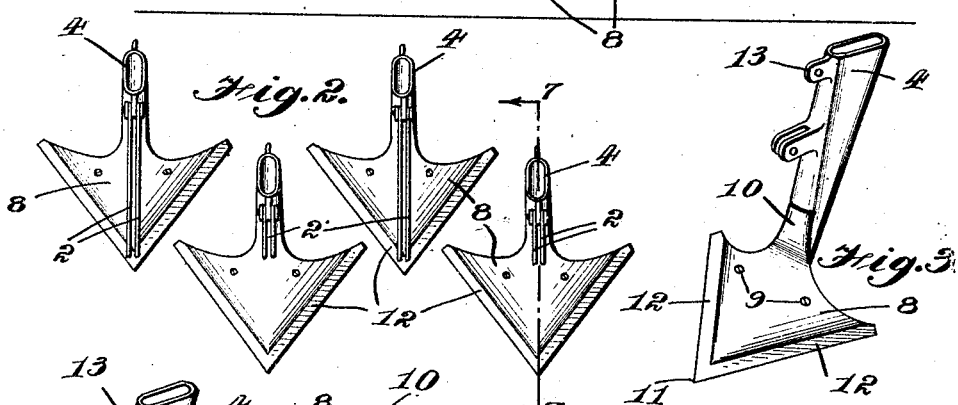
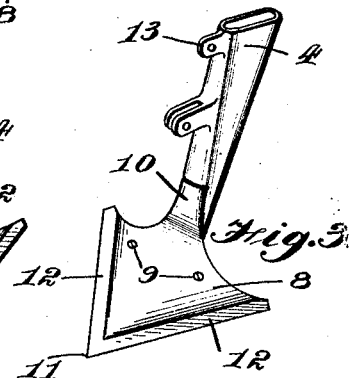
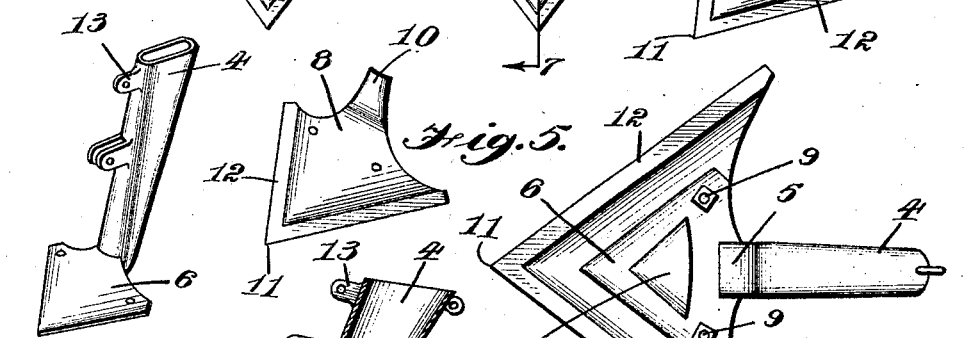
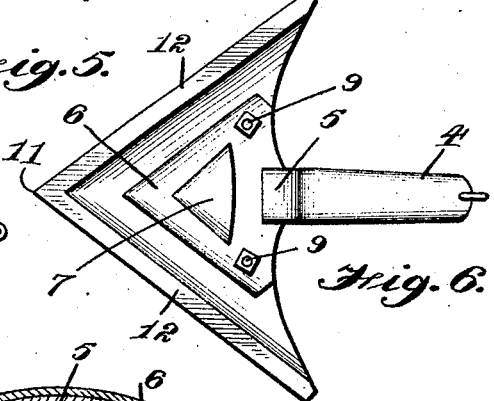
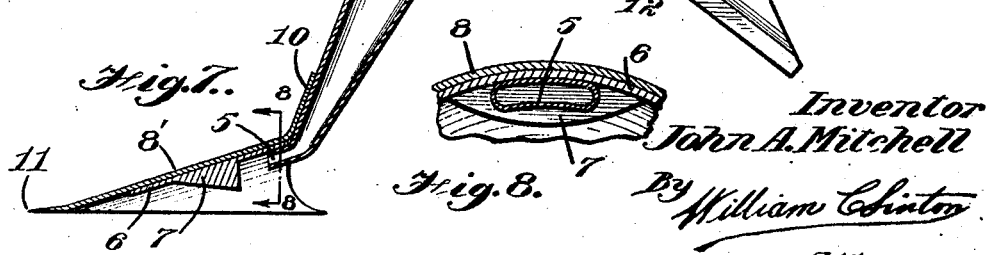
Inventor
John A. Mitchell
By William Clinton
Attorney Patented Mar. 2, 1926.

1,574,917

UNITED STATES PATENT OFFICE.

JOHN ABERCROMBIE MITCHELL, OF LAWSON, SASKATCHEWAN, CANADA.

GRAIN-DRILL TOOTH.

Application filed April 18, 1923. Serial No. 632,949.

*To all whom it may concern:*

Be it known that I, JOHN A. MITCHELL, a subject of the King of Great Britain, residing at Lawson, Saskatchewan, Canada, have invented certain new and useful Improvements in a Grain-Drill Tooth; and I do hereby declare that the following is a full, clear, and exact description of the invention, such as will enable others skilled in the art to which it appertains to make and use the same.

The present invention pertains to a novel grain drill tooth for attachment to seed grain drills and may be called a sub-seeder. This device may be attached to any make of seed drill to take the place of the discs, hoes, shoes and other means for depositing seed in the ground, doing the work of a duckfoot cultivator and seeder combined.

A device constructed in accordance with the invention includes a grain pipe or spout to the lower end of which is attached a triangular plate, two edges being sharpened while the third edge is raised, the latter engaging the pipe. The lower end of the pipe may have fixed thereto or cast integrally therewith a bottom block upon which the plate may be detachably secured. The lower face of the block is formed with a deflector adjacent the lower end of the pipe, serving as a spreader for the seed. The sharpened edges of the plate cut the weeds in the same manner as a duckfoot cultivator, while the seed delivered through the spout is deposited in the furrow and is broadcasted by the block adjacent the outlet end of the spout, as pointed out more clearly below.

The invention is fully disclosed in the following description and in the accompanying drawings in which:

Figure 1 is a side elevation of the lower portion of a seed drill having the invention applied thereto;

Figure 2 is a plan section on the line 2—2 of Figure 1;

Figure 3 is a perspective view of one of the seeders;

Figure 4 is a perspective view of the device with the plate removed;

Figure 5 is a detached perspective view of the plate;

Figure 6 is a bottom plan view of one of the seeders;

Figure 7 is a longitudinal section on the line 7—7 of Figure 2; and,

Figure 8 is a section on the line 8—8 of Figure 7.

Throughout these views in which like reference characters are employed to designate corresponding parts, the numeral 1 indicates in general a seed drill including the usual drag bars 2 and feed pipes 3 for the seed.

The attachment or sub-seeder occupies the position of the usual discs, hoes or similar members and comprises a spout 4 which tapers towards the lower end where it is flattened as at 5. A bottom block 6 of triangular configuration is welded to or cast integrally with the lower end of the shank. This block is formed on its lower surface with a deflector 7 which is disposed adjacent the outlet end of the pipe and serves to broadcast the seed.

A cutting plate 8 rests upon the block 6 and may be detachably secured thereto by bolt and nut devices 9. The heads of the bolts may be countersunk in the plate. This plate is also of substantially triangular shape, and the edge extending transversely of the spout is formed with an extension 10 bearing against the spout and serving as a centering device for the plate. The remaining edges which form a forwardly pointing apex 11 are sharpened as at 12 for cutting weeds and digging up the earth. The plate 8 may be removed for sharpening or replacement by manipulation of the devices 9.

At the upper end of the shank is formed a suitable means 13 for attachment to the drag bar 2, as shown in Figure 1. The feed pipes 3 extend into the spouts, as is well known in the art.

In operation the apex 11 touches the ground, and the soil is thrown to both sides of the furrow by means of the medially raised back 8' of the plate 8. The seed passing through the pipe 3 strikes the deflector 7 which broadcasts the seed and also prevents the end 5 from becoming filled with dirt. The sharpened edges 12 cut the weeds over which they pass, and a set of these devices applied to a drill will therefore cultivate all the land. Among the advantages of these devices, it may also be stated that they perform good work in either dry or wet land, as they cut beneath the surface and raise it sufficiently to deposit the seed therebeneath.

While a specific embodiment of the invention has been illustrated and described, it is to be understood that various alterations in the details of construction may be made without departing from the spirit of the invention as indicated by the appended claims.

Having thus fully described the invention, what I claim as new and desire to protect by Letters Patent is:—

1. A grain drill tooth comprising a spout having its delivery end bent at an angle to the horizontal, a three-edged plate attached to said spout at the delivery end and having one edge extending transversely of the spout, the remaining edges of the plate being sharpened, and a solid block secured to said plate and spaced from the delivery end of the spout, said block presenting to said delivery end a vertical deflecting surface intersected by the prolonged longitudinal axis of said end.

2. A grain drill tooth comprising a spout having its delivery end bent at an angle to the horizontal, a three-edged plate attached to said spout at the delivery end and having one edge extending transversely of the spout, said plate being bent medially from said edge to the opposite vertex, the remaining edges of the plate being sharpened, and a solid block secured in the bend of the plate, and spaced from the delivery end of the spout, said block presenting to said delivery end a vertical deflecting surface intersected by the prolonged longitudinal axis of said end.

In witness whereof I have hereunto set my hand.

JOHN ABERCROMBIE MITCHELL.